United States Patent
Kristiansen

(10) Patent No.: US 10,579,249 B2
(45) Date of Patent: Mar. 3, 2020

(54) METHODS, SYSTEMS, AND COMPUTER READABLE MEDIA FOR UTILIZING AN AUGMENTED SCROLL BAR

(71) Applicant: Keysight Technologies Singapore (Sales) Pte. Ltd., Singapore (SG)

(72) Inventor: Jesper Soendergaard Kristiansen, Simi Valley, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 80 days.

(21) Appl. No.: 15/410,415

(22) Filed: Jan. 19, 2017

(65) Prior Publication Data
US 2018/0203594 A1    Jul. 19, 2018

(51) Int. Cl.
| | | |
|---|---|---|
| *G06F 3/048* | (2013.01) | |
| *G06F 3/0485* | (2013.01) | |
| *G06F 17/24* | (2006.01) | |
| *H04L 12/24* | (2006.01) | |

(52) U.S. Cl.
CPC ........ *G06F 3/04855* (2013.01); *G06F 17/245* (2013.01); *G06F 2203/04804* (2013.01); *H04L 41/22* (2013.01)

(58) Field of Classification Search
CPC .............. G06F 3/04855; G06F 17/245; G06F 2203/04804; G06F 3/04
See application file for complete search history.

(56) References Cited

U.S. PATENT DOCUMENTS

| | | | | | |
|---|---|---|---|---|---|
| 5,977,972 | A  * | 11/1999 | Bates | .................. | G06F 3/04855 715/786 |
| 6,690,401 | B1 * | 2/2004 | Stead | .................... | G06F 3/0482 713/503 |
| 9,715,482 | B1 * | 7/2017 | Bjorkegren | ............. | G06F 17/24 |
| 2009/0282362 | A1 * | 11/2009 | Matsumoto | ......... | G06F 3/04855 715/787 |
| 2011/0161695 | A1 * | 6/2011 | Okita | .................... | G06F 1/3209 713/310 |
| 2013/0080904 | A1 * | 3/2013 | Kong | .................. | G06F 3/04855 715/738 |

OTHER PUBLICATIONS

Ibach, Susan, "Visual Studio Tips and Tricks: Enhanced Scroll Bar," Microsoft Developer, Go DevMENTAL, https://blogs.msdn.microsoft.com/cdnstudents/2014/01/21/visual-studio-tips-and-tricks-enhanced-scroll-bar/, pp. 1-6 (Jan. 21, 2014).

* cited by examiner

*Primary Examiner* — Jeanette J Parker

(57) ABSTRACT

The subject matter described herein relates to methods, systems, and computer readable media for utilizing an augmented scroll bar. In some examples, a system for utilizing an augmented scroll bar includes a processing unit, a memory accessed by the processing unit, and a scroll bar manager that is stored in memory and when executed by the processing unit is configured to display contents of a data file within a table layout of a display field. The scroll bar manager is further configured to display, within the display field, a scroll bar user interface element that includes a scrolling region and a view slider element that traverses the scrolling region, wherein the view slider element indicates a position of the table layout within a portion of the data file and the scrolling region graphically illustrates indicia corresponding to dynamic status information of data elements included in the data file.

20 Claims, 7 Drawing Sheets

METHODS, SYSTEMS, AND COMPUTER READABLE MEDIA FOR UTILIZING AN AUGMENTED SCROLL BAR

TECHNICAL FIELD

The subject matter described herein relates generally to graphical user interfaces and scroll bar elements. More particularly, the subject matter described herein relates to methods, systems, and computer readable media for utilizing an augmented scroll bar.

BACKGROUND

At present, scroll bars typically occupy a scroll bar display region within a window that includes a user interface element scrolling region that is used to represent the extent of a stored data file, such as a document. The scroll bar user interface element typically includes a slider element, such as a colored or shaded rectangle located within the scrolling region. Further, the size of the slider element corresponds to the portion of data is currently being presented in the data display field of the display screen. In the event the slider element is manipulated by a user (e.g., utilizing a computer mouse) through the scrolling region, the display field is updated to present the data file contents corresponding to the new position of the slider element within the scrolling region. Notably, while typical scroll bars are configured to indicate the portion of the data file that is presently being displayed (which is represented by the size of the slider element relative to the length of the corresponding scrolling region), no other status information is typically indicated or displayed in the scroll bar user interface.

In light of these difficulties, there exists a need for methods, systems, and computer readable media for utilizing an augmented scroll bar.

SUMMARY

The subject matter described herein relates systems, methods, and computer readable media for utilizing an augmented scroll bar. In some examples, a system for utilizing an augmented scroll bar includes a processing unit, a memory accessed by the processing unit, and a scroll bar manager that is stored in memory and when executed by the processing unit is configured to display contents of a data file within a table layout of a display field. The scroll bar manager is further configured to display, within the display field, a scroll bar user interface element that includes a scrolling region and a view slider element that traverses the scrolling region, wherein the view slider element indicates a position of the table layout within a portion of the data file and the scrolling region graphically illustrates indicia corresponding to dynamic status information of data elements included in the data file.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
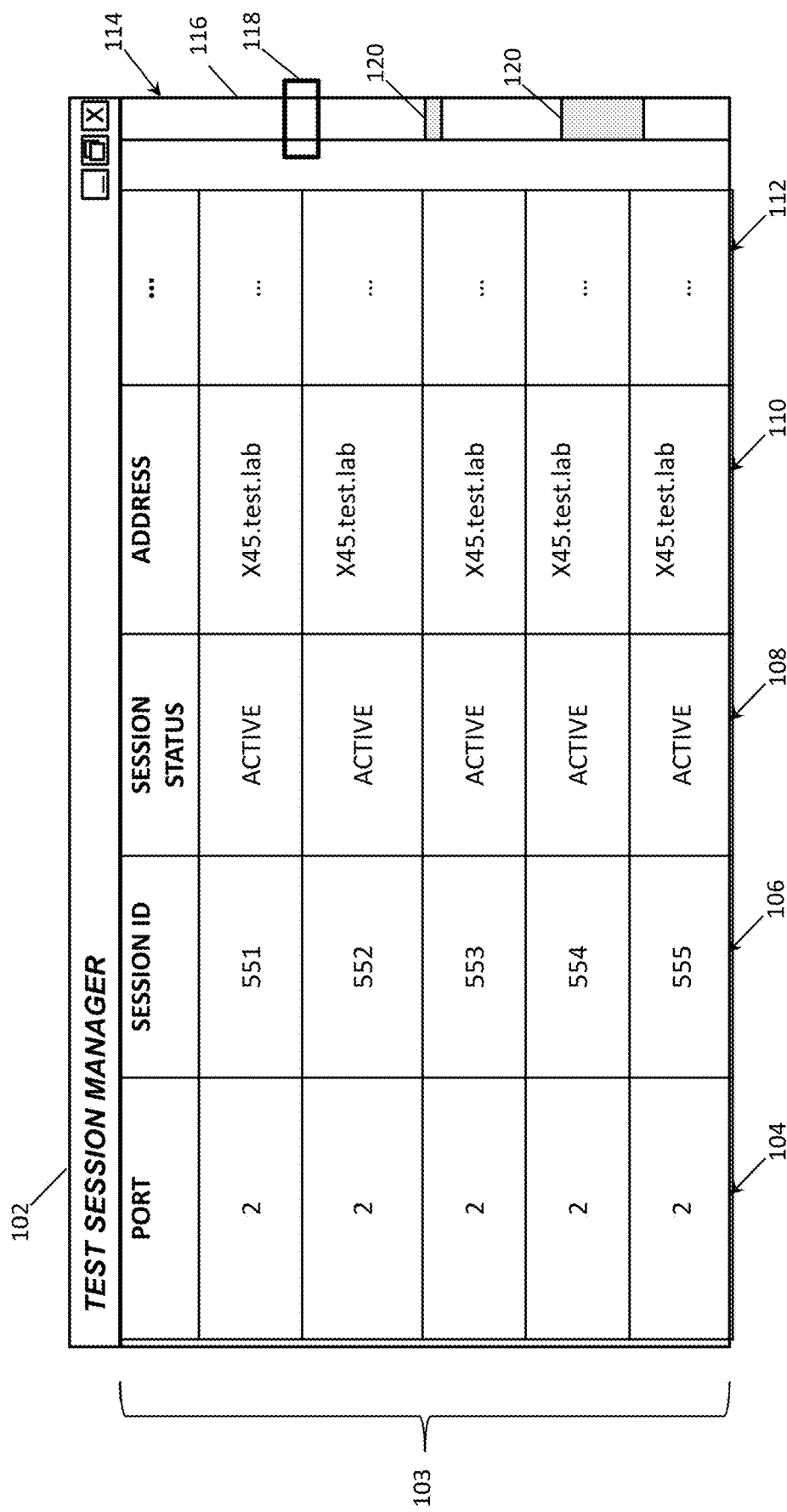
FIG. 1 is a block diagram of an exemplary display field including a table layout and a scroll bar user interface element in accordance with embodiments of the subject matter described herein.

The subject matter described herein includes systems, methods, and computer readable media for utilizing an augmented scroll bar. In particular, the disclosed subject matter enables a user to utilize an augmented scroll bar user interface element to promptly assess dynamic status information associated with data elements contained in a data file being displayed. For example, FIG. 1 is a block diagram illustrating a display field 102 that includes a table layout 103 of a data file and an associated scroll bar user interface element 114. Table layout 103 includes a plurality of rows and columns that collectively contain various types of information pertaining to data elements included in a data file. In some examples, table layout 103 may include a port column 104, a session identifier column 106, a session status column 108, an address column 110, and the like. Similarly, table layout 103 may include a number of rows that serves as data element entries (e.g., session entries), each of which includes information categorized by columns 104-112. As shown in FIG. 1, scroll bar user interface element 114 includes a scrolling region 116 and a view slider element 118. In some examples, scrolling region 116 includes scrolling region status indicator section 120 that visually indicate the dynamic status of one or more scrolling region sublayers and/or a plurality of child data elements (e.g., session entries) that comprise the indicated portions of scrolling region 116. As used herein, the term "dynamic status" or "dynamic status information" refers to changing states or status for a particular entity or element, such as, but not limited to, a hardware element, a software element, a virtual element and the like. For example, dynamic status information as it relates to a monitored communications port may include dynamic (i.e., subject to change) states such as active, inactive, failed, operable, inoperable, congested, uncongested, etc. As described herein and below, indicia may be generated and displayed on the scroll bar user interface element 114 to visually represent the various dynamic states that the particular entity or element is currently experiencing/exhibiting. In some embodiments, scrolling region status indicator section 120 may be color-coded (or shaded) in order to indicate a problematic scrolling region sublayer that includes inactive child data elements (e.g., failed sessions). In some examples, the child data elements may include network communication sessions, devices, device ports, or any other elements a network operator may monitor via a control plane. Similarly, scrolling region status indicator section 122 may be shaded or color-coded to indicate the same dynamic status/state or a different dynamic status/state as compared to section 120. It should be noted that as child data elements are repaired or made active, scrolling region 116 may be updated (e.g., via a scroll bar manager) to reflect the remedied child data elements. For example, if sessions associated with section 120 are remedied (e.g., fixed or made active), then section 120 may display this change in scrolling region 116 (e.g., sections 120 may be shaded or color coded appropriately). In some embodiments, the display and functionality of scroll bar user interface element 114 and table layout 103 may be facilitated by an executed scroll bar manager (SBM) element (e.g., a software module) described in additional detail below. For example, in the event of a change in state, a notification is sent by lower levels (e.g., a protocol state machine on a port CPU) to a views controller (not shown) managed by the SBM element via a corresponding client-based protocol state machine. The views controller and/or SBM element subsequently updates the ranges (e.g., range of sessions) on a scroll bar component (e.g., scroll bar, scrolling region, etc.). In response, the scroll bar component will then re-render itself (e.g., modify the displayed indicia in the form of shaded and/or color-coded areas) based on the updated values (e.g., based on a new set of ranges generated by the SBM element and/or views controller).

As shown in FIG. 1, display field 102 (e.g., which may be displayed on a computer screen) may be used to display the contents of the data file, such as a hypertext document, a spreadsheet, a database file, or any other electronic file that is presented in a grid or table layout. In some examples, a user may manipulate the content of display field 102 through the use of a pointer that is controlled by a pointing device, such as a computer mouse device. Scroll bar user interface element 114 as depicted in display field 102 is configured for scrolling vertically through the window to display different regions of a data file of a document. Although the Figures described herein depict vertically aligned scroll bar user interface elements, horizontally aligned scroll bar user interface elements may be utilized without departing from the scope of the disclosed subject matter.

In some examples, view slider element 118 may comprise a sliding scroll bar element that is used to designate a portion of a data file to be displayed within display field 102. In some examples, view slider element 118 may be transparent or represented as a boxed outline by which the underlying scrolling region 116 may be viewed by a user. In some examples, the disclosed subject matter generally operates by displaying one or more scrolling region status indicator sections on a scroll bar user interface element 114. More specifically, the scrolling region status indicator sections are typically represented as indicia in the form of shaded and/or color-coded areas that are displayed on scrolling region 116 via a display field 102. Scroll bar user interface element 114 may be considered as a graphical user interface control configured for designating portions of the data file to be displayed in table layout 103.

In some examples, scrolling bar user interface element 114 includes a scrolling region 116 whose vertical length is mapped by a scroll bar manager to the length of the data file being viewed. For example, view slider element 118 may be positioned at a particular position along the scrolling region 116 that represents a currently viewed portion of a data file that is displayed on table layout 103. View slider element 118 may also be appropriately within scrolling region 116 sized by a scroll bar manager to represent the viewable portion of the data file being accessed. For example, to present the relative portion of a document file that is currently displayed in display field 102 by way of user manipulation of view slider element 118, a user may be able to slide the view slider element 118 along scrolling region 116 to vary the currently selected sections of the scroll bar user interface element 114. Moreover, other controls, such as arrow buttons which may be used to incrementally move view slider element 118 up or down, may also be enabled by the scroll bar user interface element 114. In particular, the scroll bar manager may enable view slider element 118 to be controlled in response to a keyboard input, a scroll wheel on a mouse, a selection of the scroll region, and the like.

Figure 2:
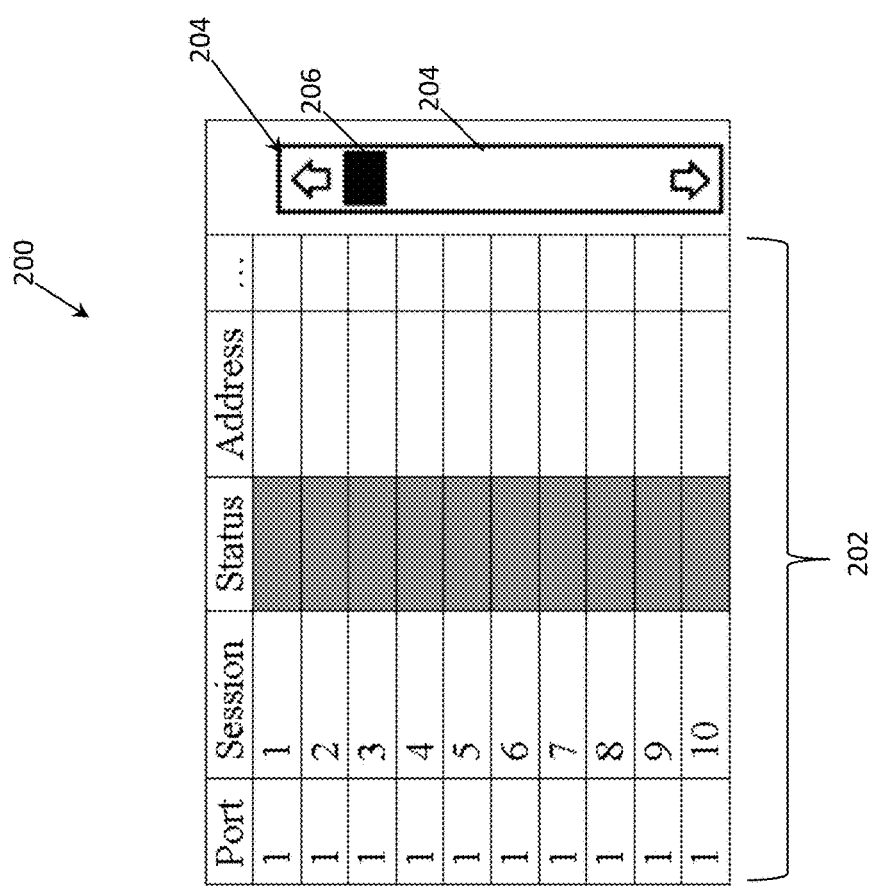
FIG. 2 depicts an illustration of a table layout and a scroll bar user interface element.

FIG. 2 depicts an illustration of a table layout and a scroll bar user interface element. Notably, FIG. 2 illustrates a display field 200 that includes a table layout 202 identifying a plurality of sessions being communicated over a port. Each data element entry (which is represented by a row on the table layout) may include a color coded (e.g., green=satisfactory/active/operable status; red=unsatisfactory/inactive/failed status) or shaded status indicator in the "status" column. Display field 200 further includes a scroll bar user interface element 204 that comprises a slider element 206 that may be manipulated by a user to traverse vertically over a scrolling region 208. Notably, scroll bar user interface element 204 does not include any status indicator sections or other graphics within scrolling region 208. As such, a user is compelled to operate slider element 206 in order to view the status indicator (in the status column) associated with each entry displayed in table layout 202. In some examples, a user may also be able to utilize a feature that jumps to a first failed session entry. However, such a mechanism affords the user little understanding for appreciation of any existing failure patterns amongst the entries in an entire data file.

Figure 3:
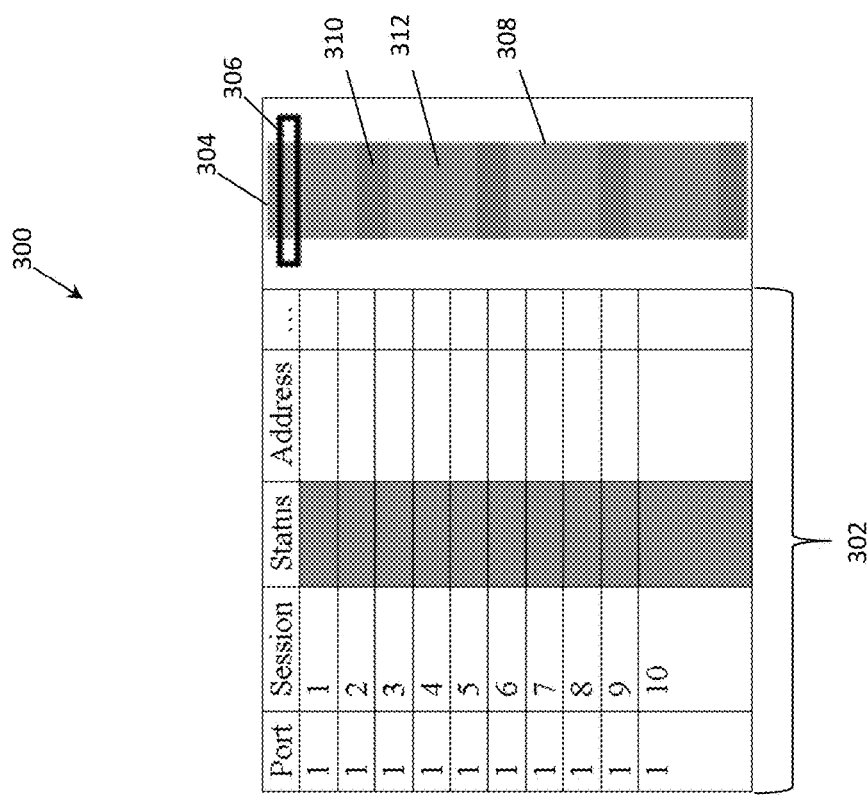
FIG. 3 depicts an illustration of a table layout and an augmented scroll bar user interface element in accordance with embodiments of the subject matter described herein.

In contrast, FIG. 3 depicts an illustration of a table layout and an augmented scroll bar user interface element in accordance with embodiments of the subject matter described herein. For example, display field 300 includes a table layout 302 and an augmented scroll bar user interface element 304, which comprises a view slider element 306 that may be manipulated by a user to vertically traverse along a scrolling region 308. Notably, view slider element 306 is transparent such that status indicia (e.g., the underlying status indicator sections) displayed in scrolling region 308 may be viewed by a user. In particular, scrolling region 308 may include a plurality of different status indication sections that are depicted by indicia, such color coding or shading. For example, scrolling region 308 includes a first status indicator section 310 that indicates one or more inactive or non-functional ports. In some embodiments, status indicator section 310 may be represented by indicia, such as a designated color, shading, and/or hatching that indicates a particular state or status (e.g., green color coding=active and red color coding=inactive). Likewise, scrolling region 308 also includes a second status indicator section 312 that indicates active or functional ports (e.g., green coloring and/or shading). Thus, instead of using a scroll bar user interface element to view the status column entries/colors included in the session entries in table layout 302 by scrolling up or down, a user may utilize the augmented scroll bar user interface element. Such a scroll bar enables a user to view indicia displayed within scrolling region 308 and immediately ascertain the distribution of failures and identify a problematic pattern. For example, consistent striping and/or patterns within scrolling region 308 may allow a user to promptly assess that the first 500 sessions hosted on each port have failed or that all of the sessions on the last two ports have failed with a single glance as opposed to scrolling through the entire data file. As used herein, the term "port" may refer to a computer device port, a test port, a software communication port, or the like. Similarly, as used herein, the term "session" may refer to a network communication session (e.g., HTTP session, a SIP session, a TCP session, etc.), a test communication session, and the like.

Figure 4:
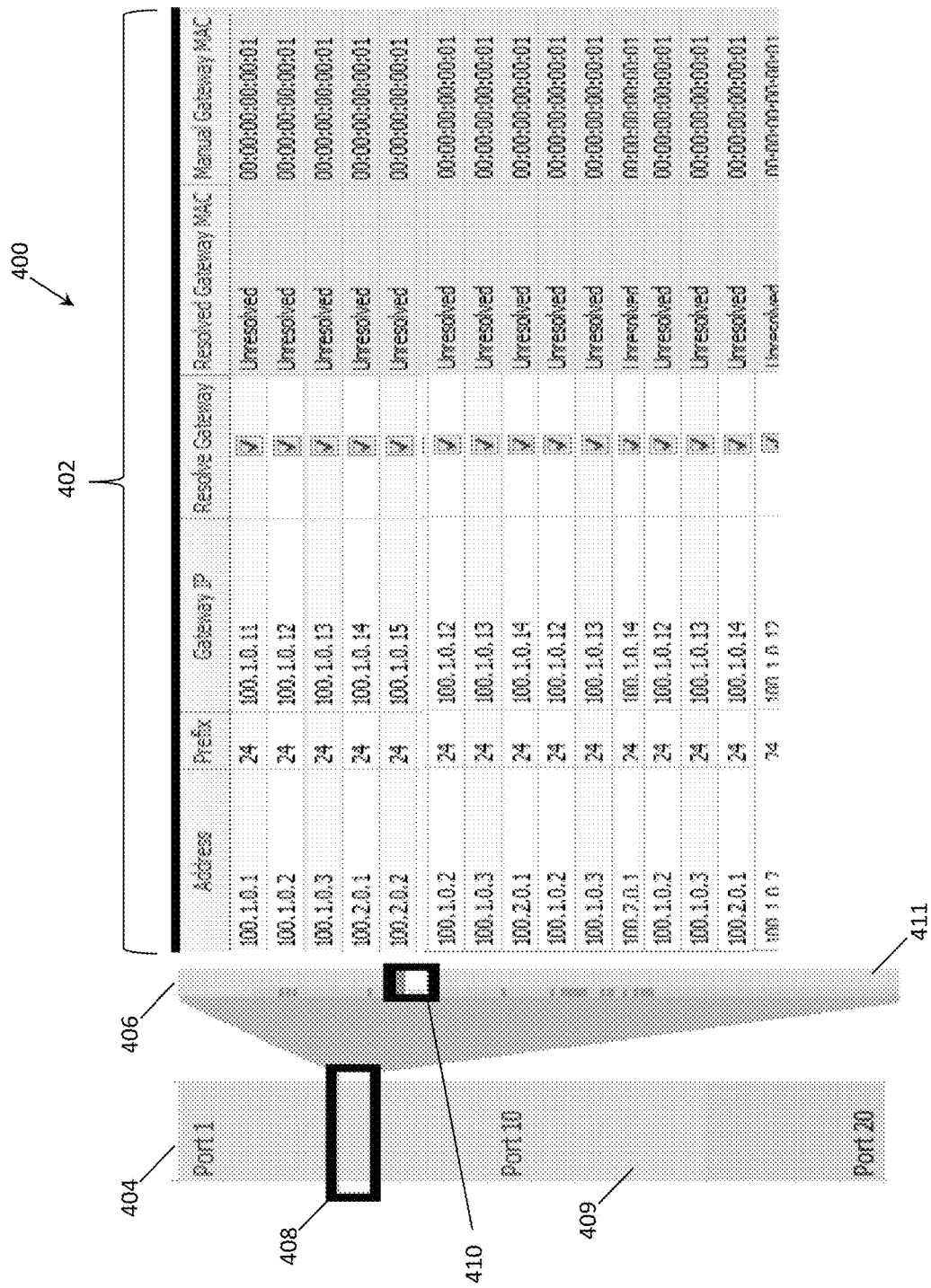
FIG. 4 depicts an illustration of a multistep augmented scroll bar user interface element in accordance with embodiments of the subject matter described herein.

In many instances, there is a need in the user interface to navigate a single expansive range or a plurality of nested ranges to locate one particular data element or entry. One drawback associated with nested ranges is that expansion of the nested ranges can produce a single range that contains a significant number of items. Such a nested range expansion makes it difficult to find or locate the one item of interest to the user or operator. Accordingly, the disclosed subject matter facilitates an augmented scroll bar that includes a scroll bar user interface control element that employs a slider control for each nested range level and using color coding on each level to depict indicia (e.g., items of interest) for that range. As such, the disclosed subject matter may utilize one for more scrolling region sublayers as related to the scrolling bar user interface element. For example, FIG. 4 illustrates a multistep augmented scroll bar user interface element in accordance with embodiments of the subject matter described herein. More specifically, FIG. 4 depicts a display field 400 that includes a table layout 402, a scroll bar user interface element 404, and a sublayer scroll bar user interface element 406. In some examples, scroll bar user interface element 404 (i.e., a first scroll bar user interface element) includes a view slider element 408 that is manipulated by a user (e.g., using a computer mouse, arrow keys, etc.) to vertically traverse scrolling region 409. As described above with respect to FIG. 3, scrolling region 409 may include one or more status indicator sections (e.g., color coded or shaded areas in scrolling region 409). In scroll bar user interface element 404 for example, indicia such as shaded areas (e.g., darker shading or, alternatively, red color coding) in scrolling region 409 indicate that port 1 and port 10 are unsatisfactory. For example, the indicia in scrolling region 409 may indicate problematic sessions and/or inactive host gateways. Similarly, the shading scheme (e.g., light shading or, alternatively, "green" color coding) shown in FIG. 4 indicates that port 20 and its supported sessions are active and/or functioning. Although only two shading types are depicted in FIG. 4, other types of indicia (e.g., color coding, hatching patterns, etc.) or additional shading types may be utilized without departing from the scope of the disclosed subject matter.

FIG. 4 further depicts a second scrolling region 411 in scroll bar user interface element 406. Notably, scrolling region 411 indicates all of the data elements (e.g., sessions) that are included under the positioning of view slider element 408 in scroll bar user interface element 404. Similar to scroll bar user interface element 404, scroll bar user interface element 406 may also include indicia such as color-coding or shading to indicate the dynamics statuses of the underlying child data elements (e.g., communication sessions supported/handled by the ports). Further, a second view slider element 410 may be manipulated by a user (e.g., using a computer mouse, arrow keys, etc.) to vertically traverse scrolling region 411. Table layout 402 displayed in display field 400 contains a listing of sessions included within the portion of scrolling region 407 that is located underneath (and/or within the border of) the positioning of second view slider element 410. Shading levels that are represented in the scrolling regions of each of multistep scroll bar user interface elements 404 and 406 enable a user to promptly view both the dynamic status (e.g., active/inactive/failed states) of ports 1, 10, and 20 and to the dynamic status (e.g., active/inactive/failed/unresolved states) of sessions or gateways corresponding to those ports.

Although FIG. 4 only depicts one additional scroll bar user interface element, a plurality of additional scroll bar user interface elements may be utilized without departing from the scope of the disclosed subject matter. In other embodiments, the indicia utilized in the scroll bar user interface element may include multiple color codes or shadings to indicate the status of additional underlying sublayers and/or data elements. As an example, the color "green" may be designated by a scroll bar manager to indicate that the port and all supported sessions (e.g., underlying child data elements/entities) for this port are satisfactorily functioning and/or are active. Further, the color "yellow" may be designated by a scroll bar manager to indicate that the port is functionally operative, but one for more underlying sessions supported by that port may be inoperable or inactive. Likewise, the color "red" may be designated by a scroll bar manager to indicate that the port itself has failed (or is inactive) and that all of the underlying sessions supported by the port have failed or are inactive.

Figure 5:
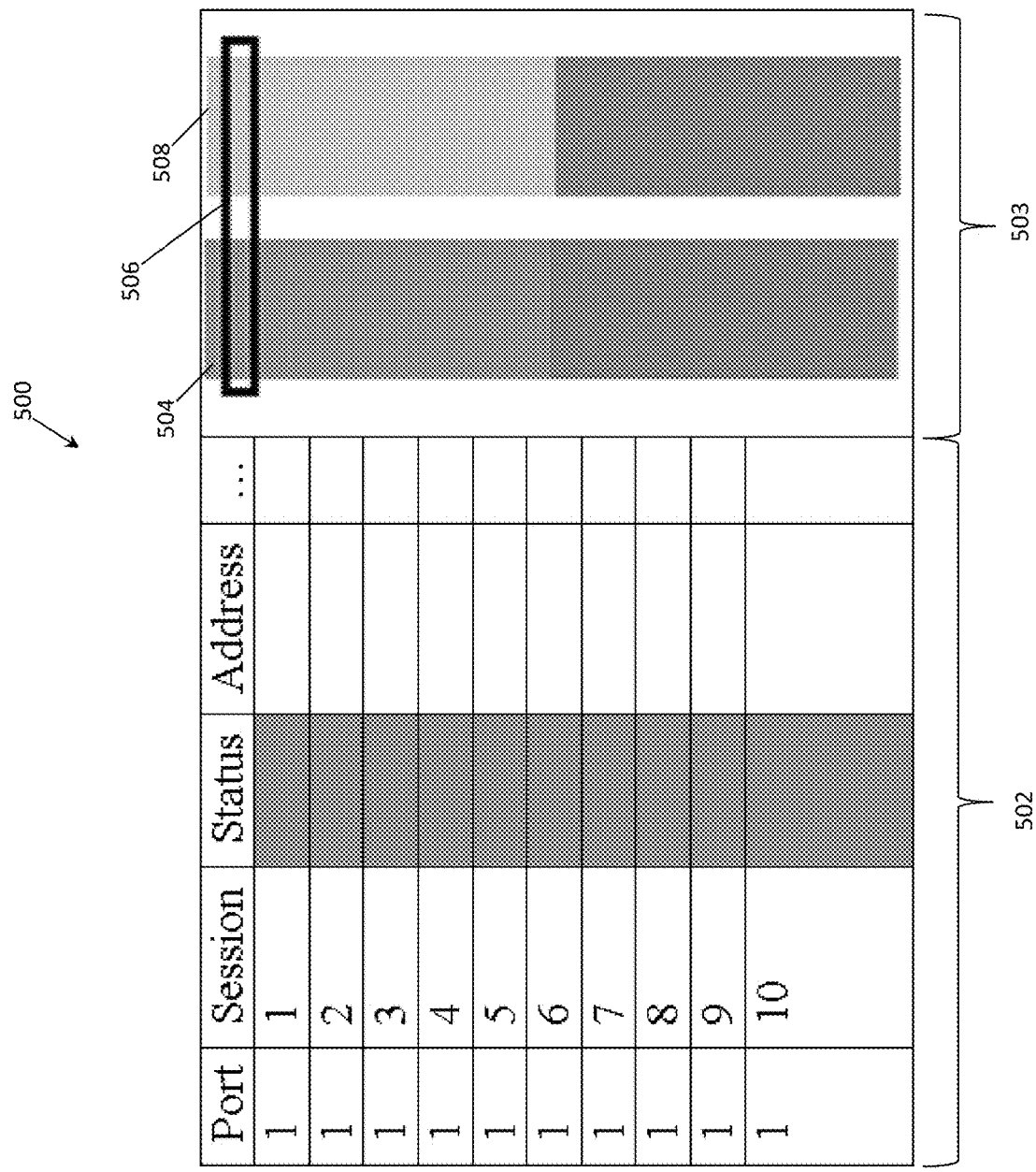
FIG. 5 depicts an illustration of an augmented scroll bar user interface element comprising multiple scrolling regions in accordance with embodiments of the subject matter described herein.

In some embodiments, a scroll bar user interface element may also include a scroll bar user interface element that includes a plurality of separate scrolling regions. As an example, FIG. 5 depicts an illustration of an augmented scroll bar user interface element comprising multiple scrolling regions associated with a single view slider element in accordance with embodiments of the subject matter described herein. As shown in FIG. 5, display field 500 includes a table layout 502 and a scroll bar user interface element 503, which in turn comprises a first scrolling region 504 and a second scrolling region 508. Notably, view slider element 506 is configured to be manipulated by a user (e.g., using a computer mouse, arrow keys, etc.) to vertically traverse both first scrolling region 504 and second scrolling region 508. In some examples, first scrolling region 504 may include shaded regions that are representative of a dynamic status (e.g., active/inactive port, operable/failed session, etc.). In contrast, second scrolling region 508 may represent static status information associated with the port and/or session. Examples of static status information that may be represented in second scrolling region 508 may include a VLAN identifier and/or an assigned quality of service (QoS) level that corresponds to the port and/or session. Although FIG. 5 only depicts two scrolling regions, additional scrolling regions may be included in a single scroll bar user interface element without departing from the scope of the disclosed subject matter.

Figure 6:
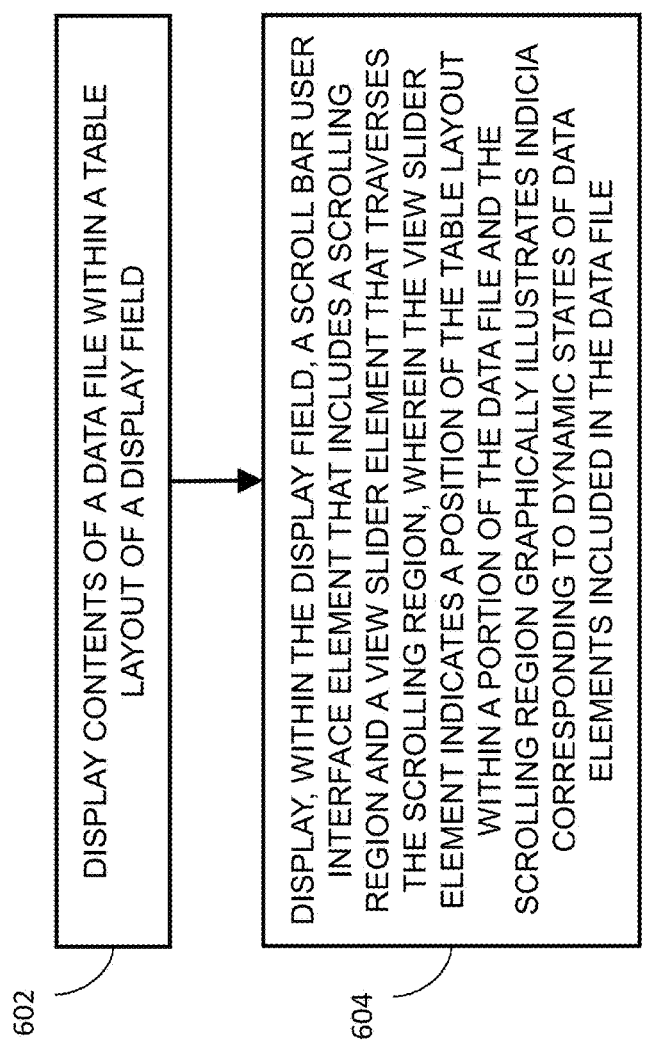
FIG. 6 depicts a flow chart of an exemplary process for utilizing an augmented scroll bar in accordance with embodiments of the subject matter described herein.

FIG. 6 depicts a flow chart of an exemplary method 600 for utilizing an augmented scroll bar in accordance with embodiments of the subject matter described herein. In particular, in step 602, contents of a data file are displayed within a table layout of the display field. In some examples, a computing system may include a screen that is used to display the table layout of a data file. Examples of a table layout and display field are depicted in FIG. 1.

In step 604, a scroll bar user interface element that includes a scrolling region and a view slider element that traverses the scrolling region is displayed within the display field. In particular, the view slider element indicates a position of the table layout within a portion of the data file and the scrolling region graphically illustrates indicia corresponding to dynamic state of data elements included in the data file. Examples of the view slider element and the scrolling region of the scroll bar user interface element are also depicted in FIG. 1. In some embodiments, an algorithm including the steps of method 600 may be embodied in a scroll bar manager (SBM) module that is stored in memory and executed by a hardware processor or processing unit (e.g., see FIG. 7 and associated description below).

Figure 7:
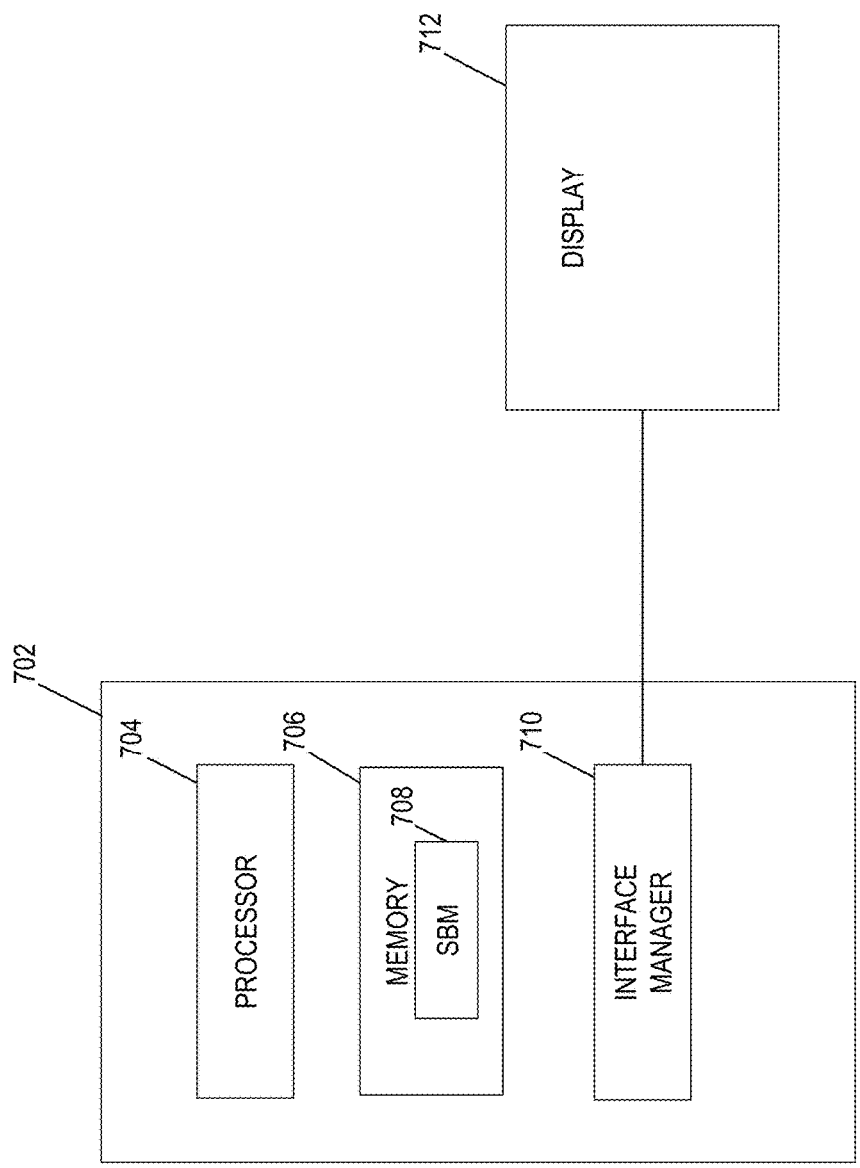
FIG. 7 depicts a block diagram of an exemplary computing system that utilizes the augmented scroll bar in accordance with embodiments of the subject matter described herein.

FIG. 7 depicts a block diagram of an exemplary computer system that utilizes the augmented scroll bar user-interface element in accordance with embodiments of the subject matter described herein. In some examples, computing system 702 includes a processor 704 (e.g., a processing unit), memory 706, and an interface manager 710, which may be used to communicatively connect to a display 712 (e.g., a computer screen). In some examples, processor 704 may be configured to load a scroll bar manager (SBM) 708 module into memory 706 for execution. For example, execution of SBM 708 by processor 704 may facilitate the generation of at least one augmented scroll bar user interface element (e.g., element 114 in FIG. 1, element 304 in FIG. 3, elements 404-406 in FIG. 4, and/or element 503 in FIG. 5) to be graphically presented on display 712 via an interface manager 710. After being visually presented on display 712, a user interface including the augmented scroll bar user interface element may be accessible and manipulated (e.g., via a computer mouse, arrow keys, etc.) by a user operating computing system 702. For example, display 712 and the execution of SBM 708 may facilitate the visual presentation of display field 102 and scroll bar user interface elements 114 as shown in FIG. 1.

It should be noted that computing system 702, SBM 708, and/or functionality described herein may constitute a special purpose computing device. Further, computing system 702, SBM 708, and/or functionality described herein can improve the technological field of graphical user interfaces and scroll bar user interface elements. For example, by generating and using a an augmented scroll bar as described herein, dynamic status information may be displayed in such a manner that facilitates the prompt viewing and assessment by a user. Such technical advantages are not afforded by present scroll bar user interfaces.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
a processing unit;
a memory accessed by the processing unit;
a scroll bar manager that is stored in memory and when executed by the processing unit is configured to:
display contents of a data file within a table layout of a display field, wherein the contents of the data file include a plurality of data elements containing operational status information for each of a respective plurality of monitored network communication sessions;
display, within the display field, a first scroll bar user interface element that includes a first scrolling region and a first view slider element that traverses the first scrolling region, wherein the first view slider element indicates a position of the table layout within a portion of the data file and the first scrolling region graphically illustrates indicia corresponding to the operational status information of data elements included in the data file, wherein the indicia is re-rendered in the first scrolling region to dynamically represent an updating of the plurality of data elements that corresponds to a change of an operating state of at least one of the plurality of monitored network communication sessions; and
display, within the display field, a second scroll bar user interface element that includes a second scrolling region that represents a portion of the data elements positioned under the first view slider element that traverses the first scrolling region.

2. The system of claim 1, wherein the second scroll bar user interface comprises a scrolling region sublayer and a second view slider element.

3. The system of claim 2, wherein the scrolling region sublayer includes a scrolling region that graphically illustrates indicia corresponding to dynamic status information of data elements included in the portion of the data file designated by the second view slider element.

4. The system of claim 3, wherein the scrolling region sublayer includes a second view slider element that designates the data elements for display in the table layout of the display field.

5. The system of claim 1, wherein the first scroll bar user interface element comprises a plurality of scrolling regions that are traversed by the first view slider element.

6. The system of claim 5, wherein the plurality of scrolling regions includes a second scrolling region that graphically illustrates indicia corresponding to static status information of the data elements.

7. The system of claim 1, wherein the first view slider element is transparent.

8. A method comprising:
displaying contents of a data file within a table layout of a display field;
displaying, within the display field, a first scroll bar user interface element that includes a first scrolling region and a first view slider element that traverses the first scrolling region, wherein the first view slider element indicates a position of the table layout within a portion of the data file and the first scrolling region graphically illustrates indicia corresponding to the operational status information of data elements included in the data file, wherein the indicia is re-rendered in the first scrolling region to dynamically represent an updating of an operational state of one or more network communication sessions respectively represented by the data elements displayed in the display field; and displaying, within the display field, a second scroll bar user interface element that includes a second scrolling region that represents a portion of the data elements positioned under the first view slider element that traverses the first scrolling region.

9. The method of claim 8, wherein the second scroll bar user interface comprises a scrolling region sublayer and a second view slider element.

10. The method of claim 9, wherein the scrolling region sublayer includes a scrolling region that graphically illustrates indicia corresponding to dynamic status information of data elements included in the portion of the data file designated by the second view slider element.

11. The method of claim 10, wherein the scrolling region sublayer includes a second view slider element that designates the data elements for display in the table layout of the display field.

12. The method of claim 8, wherein the first scroll bar user interface element comprises a plurality of scrolling regions that are traversed by the first view slider element.

13. The method of claim 12, wherein the plurality of scrolling regions includes a second scrolling region that graphically illustrates indicia corresponding to static status information of the data elements.

14. The method of claim 8, wherein the first view slider element is transparent.

15. A non-transitory computer readable medium having stored thereon executable instructions that when executed by a processor of a computer control the computer to perform steps comprising:

displaying contents of a data file within a table layout of a display field;

displaying, within the display field, a first scroll bar user interface element that includes a first scrolling region and a first view slider element that traverses the first scrolling region, wherein the first view slider element indicates a position of the table layout within a portion of the data file and the first scrolling region graphically illustrates indicia corresponding to the operational status information of data elements included in the data file, wherein the indicia is re-rendered in the first scrolling region to dynamically represent an updating of an operational state of one or more network communication sessions respectively represented by the data elements displayed in the display field; and displaying, within the display field, a second scroll bar user interface element that includes a second scrolling region that represents a portion of the data elements positioned under the first view slider element that traverses the first scrolling region.

16. The computer readable medium of claim 15, wherein the second scroll bar user interface comprises a scrolling region sublayer and a second view slider element.

17. The computer readable medium of claim 16, wherein the scrolling region sublayer includes a scrolling region that graphically illustrates indicia corresponding to dynamic status information of data elements included in the portion of the data file designated by the second view slider element.

18. The computer readable medium of claim 17, wherein the scrolling region sublayer includes a second view slider element that designates the data elements for display in the table layout of the display field.

19. The computer readable medium of claim 15, wherein the first scroll bar user interface element comprises a plurality of scrolling regions that are traversed by the first view slider element.

20. The computer readable medium of claim 19, wherein the plurality of scrolling regions includes a second scrolling region that graphically illustrates indicia corresponding to static status information of the data elements.

* * * * *